United States Patent [19]
Powers et al.

[11] Patent Number: 6,163,134
[45] Date of Patent: Dec. 19, 2000

[54] TEMPERATURE COMPENSATION OF THE PRESSURE CUTOFF OF CHARGING OF A PRESSURIZED-GAS STORAGE BATTERY

[75] Inventors: Allen R. Powers, Murrells Inlet, S.C.; Steven J. Stadnick, Lakewood, Calif.

[73] Assignee: Hughes Electronics Corporation, El Segundo, Calif.

[21] Appl. No.: 09/492,889

[22] Filed: Jan. 27, 2000

[51] Int. Cl.[7] .......................... H01M 10/44; H01M 10/46
[52] U.S. Cl. ............................................. 320/147; 320/150
[58] Field of Search ..................................... 320/128, 134, 320/136, 147, 150, 153, FOR 134, FOR 145, DIG. 17

[56] References Cited

U.S. PATENT DOCUMENTS 4,689,544  8/1987  Stadnick et al. .

*Primary Examiner*—Edward H. Tso
*Attorney, Agent, or Firm*—Terje Gudmestad

[57] ABSTRACT

A pressurized-gas battery, such as a nickel-hydrogen battery, is rapidly charged at a high charging rate until the measured pressure reaches a high-pressure limit, and thereafter slowly charged at a reduced charging rate as the measured pressure falls toward a low-pressure limit. The high-pressure limit and the low-pressure limit each decrease with increasing temperature.

11 Claims, 4 Drawing Sheets

TEMPERATURE COMPENSATION OF THE PRESSURE CUTOFF OF CHARGING OF A PRESSURIZED-GAS STORAGE BATTERY

BACKGROUND OF THE INVENTION

This application relates to pressurized-gas energy storage batteries, and, more particularly, to controlling the charging of nickel-hydrogen batteries.

Rechargeable batteries are electrochemical energy storage devices for storing and retaining an electrical charge and later delivering that charge as useful power. The energy storage battery may be recharged after it has delivered the useful power, leading to a succession of charging and discharging cycles. Familiar examples of the rechargeable energy storage battery are the lead-acid battery used in automobiles and the nickel-cadmium battery used in various portable electronic devices. Another type of battery having a greater storage capacity for its weight is the nickel oxide/pressurized hydrogen energy storage battery, an important type of which is commonly called the nickel-hydrogen battery and is used in spacecraft applications.

The nickel-hydrogen battery includes a series of active plate sets which store an electrical charge electrochemically and later deliver that charge as a useful current. The active plate sets are packaged within a hermetic pressure vessel that contains the plate sets and the hydrogen gas that is an essential active component of the energy storage battery. Each plate set includes a positive electrode, a negative electrode, and a separator between the two electrodes, all soaked with an electrolyte. In a typical nickel-hydrogen battery, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen battery delivers current at about 1.3 volts, and a number of the batteries are usually electrically interconnected in series to produce current at the voltage required by the systems of the spacecraft.

During the operation of the nickel-hydrogen battery, hydrogen is produced within the pressure vessel during the charging portion of the charging/discharging cycle. The pressure within the pressure vessel is monitored and used as an indicator of the state of charge of the energy storage battery and thence as the control parameter for the charging apparatus. That is, increasing pressure is taken to correspond to a increasing state of charge, within the limits of operation of the energy storage battery. However, the energy storage battery changes temperature during its periods of service, so that the measured pressure may change as the temperature of the hydrogen increases, without any change in the state of charge. The measured pressure may therefore be adjusted to account for changes in gas pressure associated with temperature changes rather than changes in the state of charge, prior to its use as a control parameter.

With this approach, overcharging of the storage battery is sometimes observed. Such overcharging leads to overheating of the storage battery, and possibly to its premature failure. There is a need for an understanding of the causes of such overcharging, and for an improvement to the control system to avoid this problem. The present invention fulfills that need, and further provides related advantages.

SUMMARY OF THE INVENTION

The present invention provides a battery system and method for the control of its charging. The present approach is implemented entirely in the control system of the battery charger, so that the physical structure of the battery does not change and may be optimized with respect to other characteristics. The present approach properly compensates for environmental temperature changes to the battery that are unrelated to the state of charge. The charging of the battery may therefore be controlled more precisely to avoid instabilities that lead to overcharging and thence possibly to premature failure.

In accordance with the invention, a method for charging a battery comprises the steps of providing a pressurized-gas battery, and charging the battery. A preferred pressurized-gas battery is a nickel-hydrogen battery. The step of charging includes the substeps of rapidly charging the battery at a high charging rate until the measured pressure reaches a high-pressure limit, and slowly charging the battery at a reduced charging rate, less than the high charging rate, as the measured pressure falls toward a low-pressure limit. The high-pressure limit and the low-pressure limit each decrease with increasing temperature of the battery.

The invention also provides for a battery system comprising a pressurized-gas battery having a pressure vessel, a battery internal pressure sensor having an output signal of a measured pressure within the pressure vessel, a temperature sensor having an output signal of a measured temperature of the battery, and a battery charger. The battery charger comprises a voltage and current source connected to the battery, and a charging controller receiving the measured pressure and the measured temperature and providing a control signal to the voltage and current source. The charging controller controls the voltage and current source to charge the battery at a high charging rate until the measured pressure reaches a high-pressure limit, and at a reduced charging rate (which may be a zero charging rate) until the measured pressure falls to a low-pressure limit. The high-pressure limit and the low-pressure limit each decrease with increasing temperature of the battery.

An important feature of the present invention is that the high-pressure limit and the low-pressure limit each decrease with increasing temperature of the battery. That is, the pressure cutoff of the battery charging is compensated for environmental temperature changes that change the gas pressure within the battery even when there are no changes in the state of battery charge. In the past, two approaches have been taken to temperature compensation. In one, there was no temperature compensation at all, so that the charging cutoff pressures were independent of temperature. In the other, the pressure cutoffs were increased with increasing temperature, according to the principle that gas pressure at constant volume increases with increasing temperature. Both of these approaches lead to instabilities of the charging, overcharging, and possible damage to or failure of the battery, and are not within the scope of the present invention. The present invention is based on the recognition that the charging cutoff pressure must instead be reduced with increasing temperature to prevent instability in charging. The result is better stability of the battery, avoidance of overcharging, and a lesser potential for battery damage and failure. The improved charging performance is achieved without modification to the battery itself. Only the battery charger and its control system and procedures are changed.

The present approach allows a higher state of charge to be achieved in the battery without the risk of thermal runaway, as compared with other approaches to temperature-compensation of battery internal pressure. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
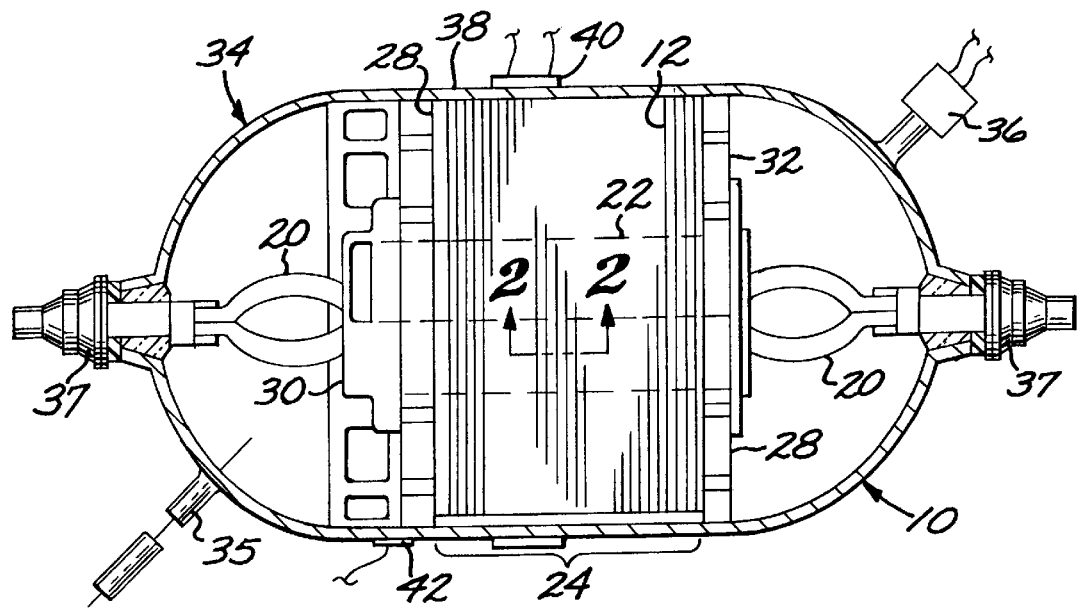
FIG. 1 is a sectional elevational view of a flight-type nickel-hydrogen battery.
Figure 2:
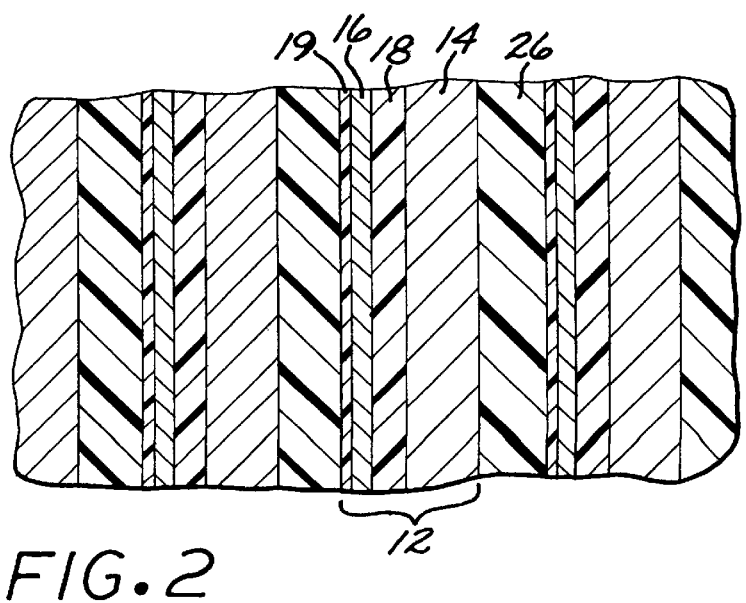
FIG. 2 is a detail of FIG. 1, taken generally on line 2—2 and illustrating the plate sets.

The present invention is preferably used in conjunction with a number of electrically interconnected nickel-hydrogen batteries 10, one of which is illustrated in FIGS. 1–2, of the pressurized gas-metal cell type. A preferred application of the present invention is to a nickel-hydrogen battery, and the following discussion will focus on that embodiment. Such a battery 10 typically comprises a plurality of individual plate sets 12. Each plate set 12 in turn comprises an anode or positive electrode 14, a cathode or negative electrode 16, and an electrolyte-containing separator 18, which physically separates the electrodes 14 and 16 and also supplies the electrolyte medium through which ionic and electron charge transfer occurs. Charging and discharging of the electrodes 14 and 16 are accomplished through respective electrical leads 20.

Various constructions of nickel-hydrogen batteries and components are disclosed in the following US Patents, whose disclosures are herein incorporated by reference: U.S. Pat. Nos. 4,683,178; 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer 19 of polytetrafluoroethylene. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide. The electrolyte, preferably a 26 or 31 percent by weight concentration of aqueous potassium hydroxide, is impregnated into the separator 18.

The individual plate sets 12 are assembled onto a central core 22 to form a stacked array 24. A monofilament polypropylene screen 26 is placed between each plate set 12 during assembly, so that oxygen liberated during overcharging at each positive electrode 14 can diffuse away from the positive electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place under compression.

The stacked array 24 is contained within a hermetically sealed pressure vessel 34 having a wall 38 manufactured of a material such as Inconel 718 nickel-base alloy which can withstand internal pressures on the order of 1,000 psia (pounds per square inch absolute), without damage by hydrogen embrittlement. The material of construction of the pressure vessel 34 has a relatively low diffusion coefficient of hydrogen therethrough, so that hydrogen is contained within the interior of the pressure vessel 34. A gas fill tube 35 allows gas content and pressure within the pressure vessel 34 to be established initially, and the tube 35 is sealed after the initial charging procedures. The electrical leads 20 pass from the interior of the pressure vessel 34 to its exterior through electrical feedthroughs 37.

The pressure vessel 34 is typically constructed in the form of a cylindrical tube having domed ends. By way of illustration, the nickel-hydrogen energy storage cell 10 having the pressure vessel 34 of external dimensions of 3½ to 5½ inches in diameter by 13–15 inches long contains about 40–100 individual plate sets 12, with a resulting electrical storage capacity of the cell of about 50 to about 350 ampere-hours. The energy storage cell 10 may be charged and discharged through thousands of cycles without apparent damage, if the charging and discharging are accomplished properly. A number of energy storage cells 10 are ordinarily combined in series or parallel arrangements as a battery, as will be discussed subsequently.

The pressure within the pressure vessel 34 is monitored by any operable pressure sensor technique. One such pressure-monitoring sensor is a pressure gauge 36 communicating with the interior of the pressure vessel, which measures interior pressure directly. Another type of pressure-monitoring sensor, which may be used instead of the pressure gauge 36, is a strain gage 40 mounted to the exterior of the wall 38 of the pressure vessel 34. The deformation of the wall 38, as measured by the strain gage 40, is a function of the internal pressure within the pressure vessel 34, which functional dependence is determined in initial calibration testing. The strain gage 40 approach to pressure measurement is preferred, inasmuch as the strain gage 40 is lighter than the pressure gauge 36 and does not involve any penetration through the wall 38 of the pressure vessel 34.

The temperature of the pressure vessel 34 is monitored by any operable technique. Preferably, a thermocouple 42 is affixed to the exterior of the wall 38 of the pressure vessel 34.

Figure 3:
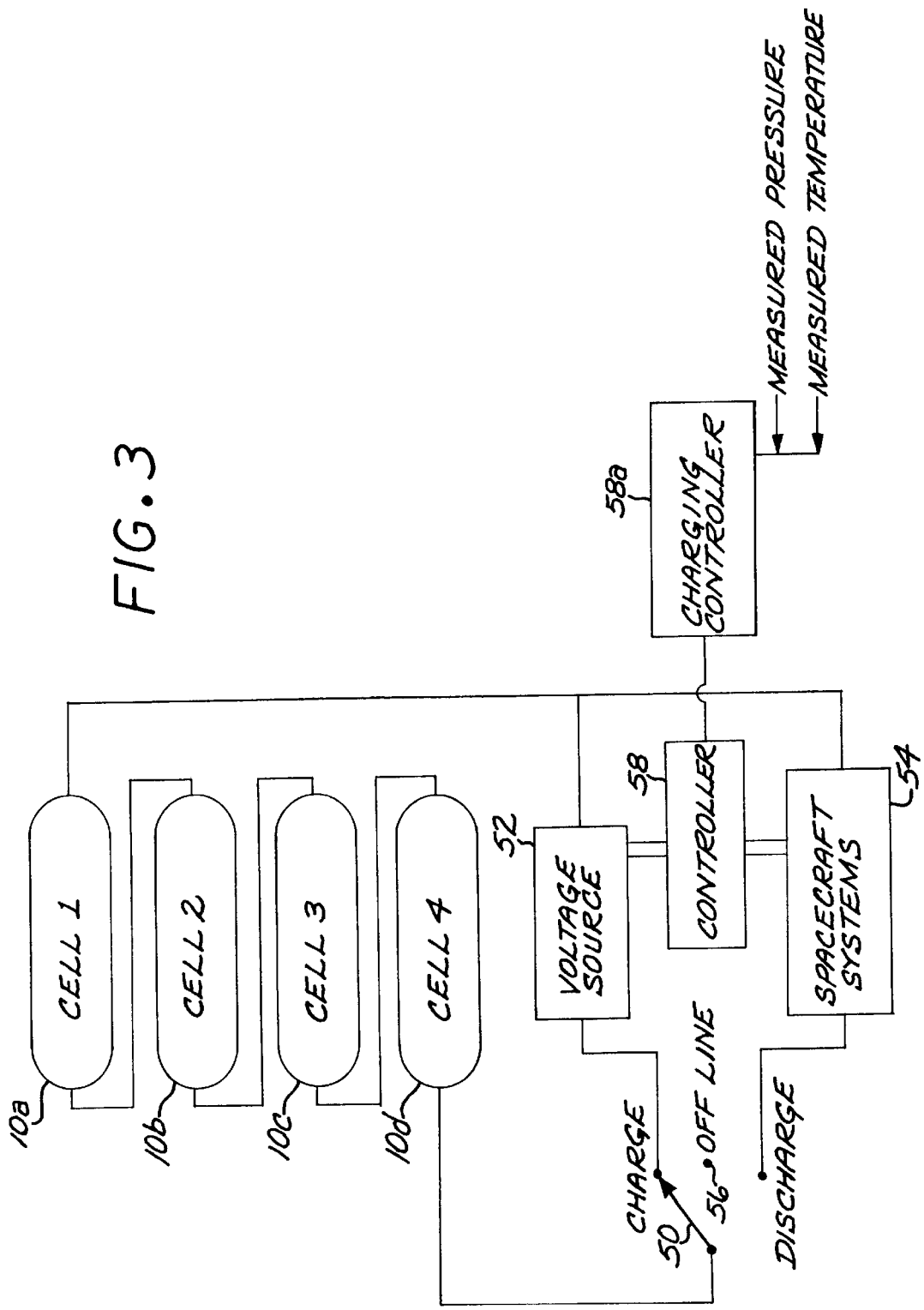
FIG. 3 is a schematic view of a battery system utilizing multiple nickel-hydrogen batteries.

FIG. 3 illustrates a group of electrically interconnected energy storage batteries and their electrically interconnections, which together form a battery system. In this case, four energy storage batteries 10a, 10b, 10c, and 10d are electrically connected in series for illustration, but the number of batteries and their mode of interconnection may be varied as needed for a particular application. When the batteries 10a–10d are to be charged, they are connected by a switch 50 to a voltage (and current) source 52, which is typically the solar cell array of the spacecraft. When the batteries 10a–10d are to be discharged to produce useful power, they are connected by the switch 50 to spacecraft systems 54 that require power. A third switch position is an off-line position 56, where the batteries 10a–10d are not connected to either the voltage and current source 52 or to the spacecraft systems 54. Additionally, there is normally a conventional electrical interconnection (not shown) directly between the voltage and current source 52 and the spacecraft systems 54 so that energy can be supplied to the spacecraft systems independent of the switch 50 and the batteries 10a–10d.

A controller 58 controls the switch 50 as well as the voltage and current source 52. The controller 58 and the voltage and current source 52 together comprise a battery charger. The controller 58 includes a charging controller 58a that controls the charging and discharging of the batteries 10a–10d, both as to timing and as to voltages and currents applied to the batteries 10a–10d. The controller 58 may command that a high charging rate be imposed upon the batteries 10a–10d by the voltage and current source 52. It may instead command that a reduced charging rate (sometimes termed a "trickle" charging rate), which is less than the high charging rate (and may be zero charging rate), be imposed upon the batteries 10a–10d. "High" and "low" are terms used relative to each other—the "high" charging rate is higher than the "low" charging rate. Although the high and low charging rates may vary according to the specific system, a high charging rate is typically C/10 to C/15 per hour, and a low charging rate is typically 0 to C/100 per hour, where C is the nameplate capacity of the battery cell.

Figure 4:
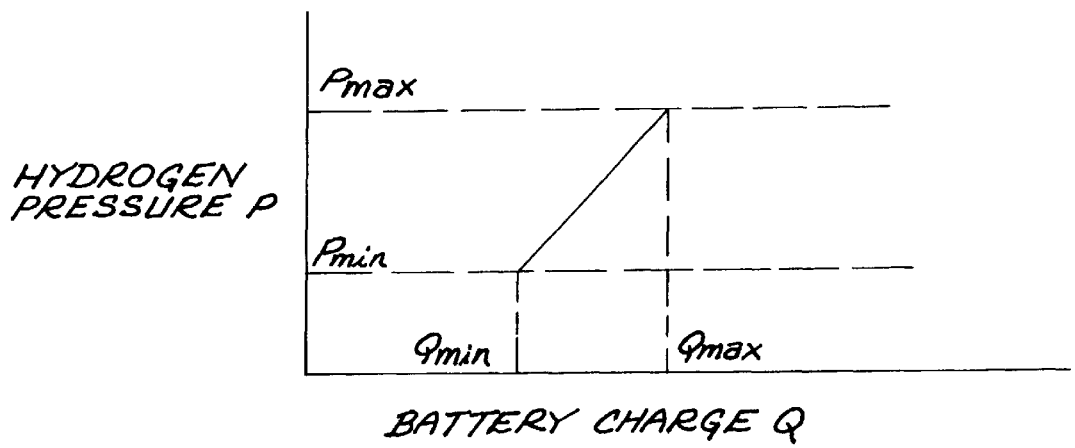
FIG. 4 is an idealized graph of the hydrogen pressure in energy storage cells as a function of charge.

FIG. 4 illustrates in an idealized form the hydrogen pressure within the pressure vessel 34 of the battery 10, as a function of the charge Q stored in the battery. The pressure varies, generally substantially but not necessarily exactly, linearly, between a minimum charge and pressure ($Q_{min}$, $P_{min}$) and a maximum charge and pressure ($Q_{max}$, $P_{max}$). $P_{max}$ is the high-pressure limit and $P_{min}$ is the low-pressure limit.

The charging controller 58a receives as one of its inputs the output signal of the pressure sensor, such as the pressure gauge 36 or the strain gauge 40. This output signal is the measured pressure within the pressure vessel. The charging controller 58a is programmed to vary the charging rate such that the high charging rate is imposed when the measured pressure is increasing and less than the high-pressure limit $P_{max}$. When the measured pressure exceeds the high-pressure limit $P_{max}$, the charging controller 58a reduces the charging rate from the high charging rate to the low charging rate (which may be no charging, a zero charging rate), until the measured pressure falls below the low-pressure limit $P_{min}$. At that point, the charging controller 58a again imposes the high charging rate until the pressure exceeds the high-pressure limit $P_{max}$, and the charging cycle repeats and continues.

This approach would be satisfactory if the temperature of the battery 10 were to remain constant. However, in ordinary operation the temperature of the battery 10 typically varies over a moderate temperature range, such as from about −10° C. to about +20° C. The gas pressure within the pressure vessel 34 of the battery 10 varies according to the temperature, by approximately (but not exactly) the perfect gas law in the case of hydrogen. Thus, the controller 58a would register a false indication of a change in charge of the battery as a result of the temperature change.

Figure 5:
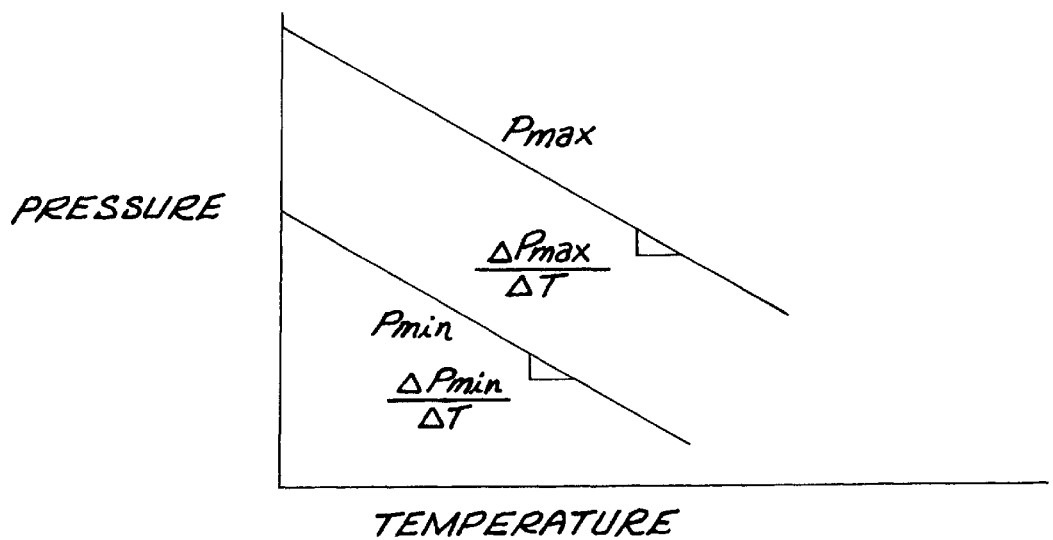
FIG. 5 is an idealized graph of the hydrogen pressure in energy storage cells as a function of temperature.

In the present approach, the measured temperature of the battery 10 is provided from the thermocouple 42 to the charging controller 58a as an input. The values selected for the high-pressure limit $P_{max}$ and the low-pressure limit $P_{min}$ are reduced as the temperature increases, as indicated in FIG. 5. The rate of change for the pressure upper limit with temperature (i.e., the slope of the high-pressure limit $P_{max}$ line in FIG. 5) may be expressed as $\Delta P_{max}/\Delta T$, which is a negative number. The values of the high-pressure limit $P_{max}$ and the low-pressure limit $P_{min}$ will vary according to each specific system. In a typical and preferred case, the high-pressure limit $P_{max}$ varies from about 100 psi at a temperature of +10° C. to about 900 psi at a temperature of +20° C.; the low-pressure limit $P_{min}$ varies from about 950 psi at a temperature of +10° C. to about 850 psi at a temperature of +20° C. The variations are approximately, but not necessarily exactly, linear.

The charge capacity Q of the battery 10 also varies according to temperature, with the charge capacity reduced as the temperature increases. The rate of change for the charge capacity may be expressed as $\Delta Q/\Delta T$, which is also a negative number. It is preferred that $\Delta P_{max}/\Delta T$ be a greater negative number than $\Delta Q/\Delta T$, in order to promote stability of the battery 10. (For example, −8 is a greater negative number than −7.) $\Delta Q/\Delta T$ is a physical property of the battery 10, so $\Delta P_{max}/\Delta T$ may be chosen by the charging controller 58a to be a greater negative number than $\Delta Q/\Delta T$. Similarly, it is preferred that $\Delta P_{min}/\Delta T$ be a greater negative number than $\Delta Q/\Delta T$, in order to promote stability of the battery 10.

Figure 6:
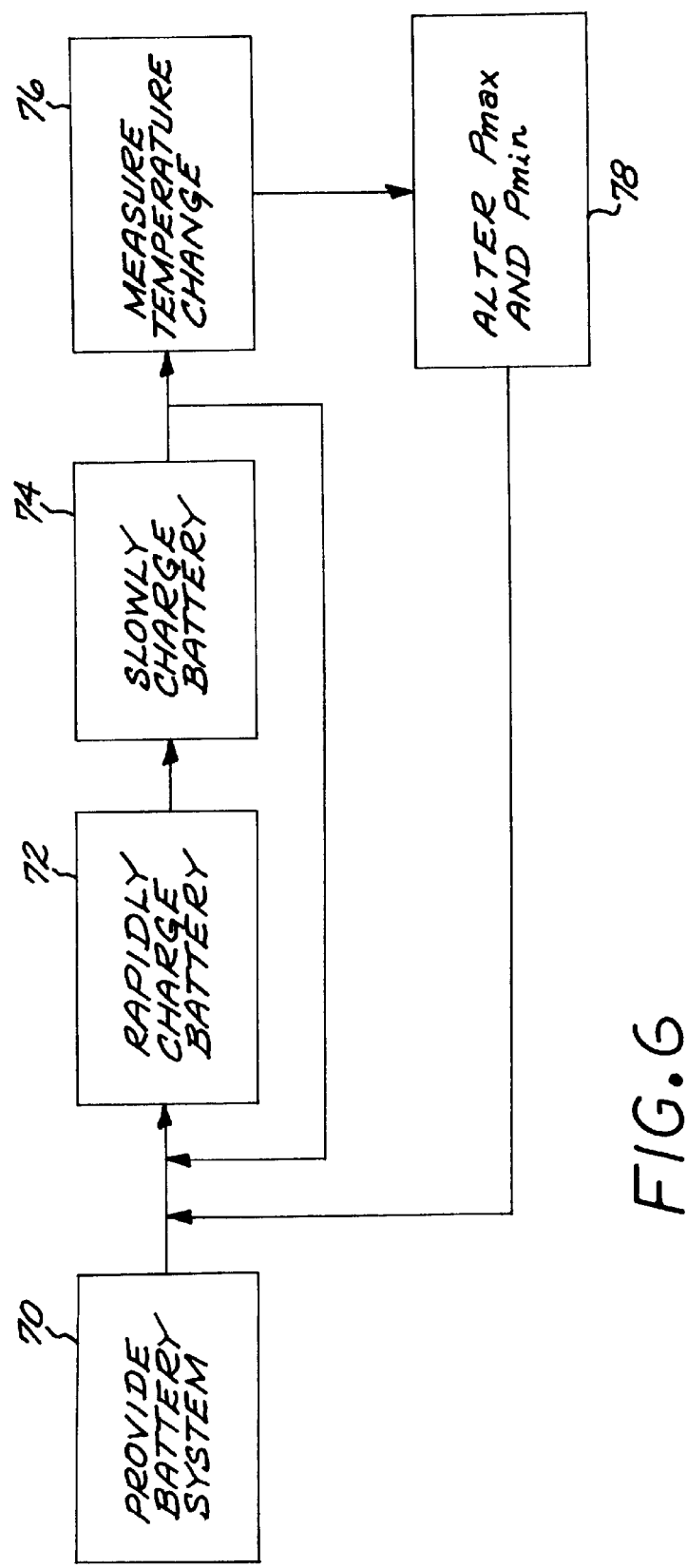
FIG. 6 is a block flow diagram of a preferred approach for practicing the invention.

FIG. 6 is a block flow diagram of an approach for practicing the invention. A battery system such as that discussed in relation to FIGS. 1–3 is provided, numeral 70. The battery 10 is fast charged until the measured battery pressure reaches the upper-pressure limit $P_{max}$, numeral 72, and thereafter slow charged (which may be as low as a zero charging rate) until the battery pressure falls to the lower-pressure limit $P_{min}$, numeral 74. The steps 72 and 74 are repeated as long as the charging controller 58a does not sense any change in the measured temperature. If a change in the measured temperature is sensed, numeral 76, the values of the upper-pressure limit $P_{max}$ and the lower-pressure limit $P_{min}$ are changed, numeral 78, according to the approach discussed above. The steps 72 and 74 (and, if there is a further temperature change, 76 and 78) are thereafter repeated, with the new values of the upper-pressure limit and the lower-pressure limit.

The present approach allows a higher state of charge to be achieved in the battery without the risk of thermal runaway.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A battery system, comprising
a pressurized-gas battery having a pressure vessel;
a battery pressure sensor having an output signal of a measured pressure within the pressure vessel;
a temperature sensor having an output signal of a measured temperature of the battery; and
a battery charger comprising
a voltage and current source connected to the battery, and
a charging controller receiving the measured pressure and the measured temperature and providing a control signal to the voltage and current source, the charging controller controlling the voltage and current source to charge the battery at a high charging rate until the measured pressure reaches a high-pressure limit, and at a reduced charging rate until the measured pressure falls to a low-pressure limit, wherein the high-pressure limit and the low-pressure limit each decrease with increasing temperature of the battery.

2. The battery system of claim 1, wherein the pressurized-gas battery is a nickel-hydrogen battery.

3. The battery system of claim 1, wherein the battery has a capacity which decreases with increasing temperature at a capacity rate of change, wherein the high-pressure limit decreases with increasing temperature at a high-pressure rate of change, and wherein the high-pressure rate of change is a greater negative number than the capacity rate of change.

4. The battery system of claim 1, wherein the battery has a capacity which decreases with increasing temperature at a capacity rate of change, wherein the low-pressure limit decreases with increasing temperature at a low-pressure rate of change, and wherein the low-pressure rate of change is a greater negative number than the capacity rate of change.

5. A battery system, comprising
   a pressurized-gas battery having a pressure vessel;
   a battery pressure sensor having an output signal of a measured pressure within the pressure vessel;
   a temperature sensor having an output signal of a measured temperature of the battery; and
   a battery charger comprising
      a voltage and current source connected to the battery, and
      a charging controller receiving the measured pressure and the measured temperature and providing a control signal to the voltage and current source, the charging controller controlling the voltage and current source to charge the battery at a high charging rate until the measured pressure reaches a high-pressure limit, and at a reduced charging rate until the measured pressure falls to a low-pressure limit, and
   wherein the battery has a capacity which decreases with increasing temperature at a capacity rate of change,
   wherein the high-pressure limit decreases with increasing temperature at a high-pressure rate of change,
   wherein the low-pressure limit decreases with increasing temperature at a low-pressure rate of change,
   wherein the high-pressure rate of change is a greater negative number than the capacity rate of change, and
   wherein the low-pressure rate of change is a greater negative number than the capacity rate of change.

6. The battery system of claim 5, wherein the pressurized-gas battery is a nickel-hydrogen battery.

7. A method for charging a battery, comprising the steps of
   providing a pressurized-gas battery; and
   charging the battery, the step of charging including the substeps of
      rapidly charging the battery at a high charging rate until the measured pressure reaches a high-pressure limit, and
      slowly charging the battery at a reduced charging rate, less than the high charging rate, as the measured pressure falls toward a low-pressure limit, wherein the high-pressure limit and the low-pressure limit each decrease with increasing temperature of the battery.

8. The method of claim 7, wherein the pressurized-gas battery is a nickel-hydrogen battery.

9. The method of claim 7, wherein the battery has a capacity which decreases with increasing temperature at a capacity rate of change, wherein the high-pressure limit decreases with increasing temperature at a high-pressure rate of change, and wherein the high-pressure rate of change is a greater negative number than the capacity rate of change.

10. The method of claim 9, wherein the battery has a capacity which decreases with increasing temperature at a capacity rate of change, wherein the low-pressure limit decreases with increasing temperature at a low-pressure rate of change, and wherein the low-pressure rate of change is a greater negative number than the capacity rate of change.

11. The method of claim 7, wherein the battery has a capacity which decreases with increasing temperature at a capacity rate of change, wherein the low-pressure limit decreases with increasing temperature at a low-pressure rate of change, and wherein the low-pressure rate of change is a greater negative number than the capacity rate of change.

* * * * *